United States Patent
Yang

(10) Patent No.: US 12,506,332 B2
(45) Date of Patent: Dec. 23, 2025

(54) DC SOLID-STATE CIRCUIT BREAKER WITH A SOLID-STATE AIDED AIRGAP THAT PROVIDES A FAIL-SAFE MECHANISM

(71) Applicant: Siemens Industry, Inc., Alpharetta, GA (US)

(72) Inventor: Guang Yang, Johns Creek, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 447 days.

(21) Appl. No.: 18/179,548

(22) Filed: Mar. 7, 2023

(65) Prior Publication Data

US 2024/0305086 A1  Sep. 12, 2024

(51) Int. Cl.
*H02H 3/00* (2006.01)
*H02H 3/087* (2006.01)
*H02H 9/04* (2006.01)
*H03K 17/16* (2006.01)

(52) U.S. Cl.
CPC ............ *H02H 3/087* (2013.01); *H02H 9/043* (2013.01); *H03K 17/161* (2013.01)

(58) Field of Classification Search
CPC .................................................... H02H 3/087
See application file for complete search history.

(56) References Cited

U.S. PATENT DOCUMENTS

| | | | | |
|---|---|---|---|---|
| 11,798,756 | B2* | 10/2023 | Yang | H02H 3/42 |
| 12,176,166 | B2* | 12/2024 | Kim | H01H 71/123 |
| 2017/0256934 | A1* | 9/2017 | Kennedy | H02H 7/0855 |
| 2020/0366079 | A1* | 11/2020 | Telefus | H02J 13/00022 |
| 2022/0085600 | A1* | 3/2022 | Qi | H02H 3/08 |
| 2023/0005676 | A1* | 1/2023 | Ho | H01H 9/548 |

FOREIGN PATENT DOCUMENTS

| | | |
|---|---|---|
| EP | 4075618 A1 | 10/2022 |
| WO | 2022211273 A1 | 10/2022 |

* cited by examiner

*Primary Examiner* — Stephen W Jackson

(57) ABSTRACT

A DC solid-state circuit breaker is provided with a solid-state aided airgap to ensure successful interruption of current at DC conditions for providing an acceptable fail-safe mechanism in case of main power electronics failure. The DC solid-state circuit breaker comprises a sensing and control circuit configured to realize designed functions. The DC solid-state circuit breaker further comprises a power electronics section that includes a first solid-state switching component for normal operations. The DC solid-state circuit breaker further comprises an air gap section disposed in series with the power electronics section and is configured to perform fail-safe interruption and to provide isolation. The air gap section includes an isolation switch which is connected in series to a fail-safe interruption combination of a current commutation switch and a second solid-state switching component, which are connected in parallel.

16 Claims, 4 Drawing Sheets

DC SOLID-STATE CIRCUIT BREAKER WITH A SOLID-STATE AIDED AIRGAP THAT PROVIDES A FAIL-SAFE MECHANISM

BACKGROUND

1. Field

Aspects of the present invention generally relate to a DC solid-state circuit breaker including a solid-state aided airgap to ensure successful interruption of current at DC conditions and provide a fail-safe mechanism in case of main power electronics failure.

2. Description of the Related Art

In today's electricity distribution, alternate current (AC) power stays vast majority as a form of supply. However, many electronic devices and end systems, such as an electric vehicle, home appliances and data centers use direct current (DC) power. Therefore, conversion between AC and DC is inevitable, and energy waste happens at the conversion point. A direct DC to DC supply is much more efficient. A fundamental issue of DC supply system is that existing protection devices, such as circuit breakers, are mainly designed for AC system and are not suitable for similar voltage DC system. For example, a 120V AC rated circuit breaker cannot be used in a 125V DC system, and can only be used with lower DC voltage, such as 48V. This is mainly due to the contacts used in today's thermal-magnetic circuit breakers create arcs, which cannot be effectively extinguished without the natural zero crossing in AC systems. For efficiency purposes, today's systems increasingly need higher DC voltages, such as 380V and 500V, which requires expensive and bulky mechanical designs, but still can suffer from reliability issues due to the inherent issue of lack of zero crossing. Therefore, a smaller, more cost effective, and more reliable DC circuit breaker design is needed.

Solid-state circuit breakers use power electronics as switching components instead of contacts as in traditional thermal-magnetic circuit breakers, and the switching process is arc free. Therefore, solid-state circuit breakers show promising aspects for use in both AC and DC systems. However, solid-state circuit breakers normally have an air gap in series of power electronic components for isolation purposes. For solid-state circuit breakers designed for AC systems, air gaps can be used as fail-safe mechanisms when power electronics fail in shorted conditions. In such situation, the arc can simply interrupt AC powers with the help of natural zero crossing. In DC systems, as discussed above, air gaps can no longer be used for such purposes, because the possibility of its own failure on interruption.

Therefore, there is a need for an improved system architecture for a DC solid-state circuit breaker.

SUMMARY

Briefly described, aspects of the present invention relate to a solid-state circuit breaker for DC applications. In this invention, a system architecture for a DC solid-state circuit breaker is described. The DC solid-state circuit breaker uses a solid-state aided airgap to ensure successful interruption of current at DC conditions, and therefore provides an acceptable fail-safe mechanism in case of main power electronics failure. This DC solid-state circuit breaker realizes the full potential of solid-state technology in DC applications.

In accordance with one illustrative embodiment of the present invention, a DC solid-state circuit breaker is provided. It comprises a sensing and control circuit configured to realize designed functions. It further comprises a power electronics section that includes a first solid-state switching component for normal operations. It further comprises an air gap section disposed in series with the power electronics section and is configured to perform fail-safe interruption and to provide isolation. The air gap section includes an isolation switch which is connected in series to a fail-safe interruption combination of a current commutation switch and a second solid-state switching component, which are connected in parallel.

In accordance with one illustrative embodiment of the present invention, a method is provided for providing a fail-safe mechanism in a DC solid-state circuit breaker. The method comprises providing a sensing and control circuit configured to realize designed functions, providing a power electronics section that includes a first solid-state switching component for normal operations and providing an air gap section disposed in series with the power electronics section, and is configured to perform fail-safe interruption and to provide isolation. The air gap section includes an isolation switch which is connected in series to a fail-safe interruption combination of a current commutation switch and a second solid-state switching component, which are connected in parallel.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
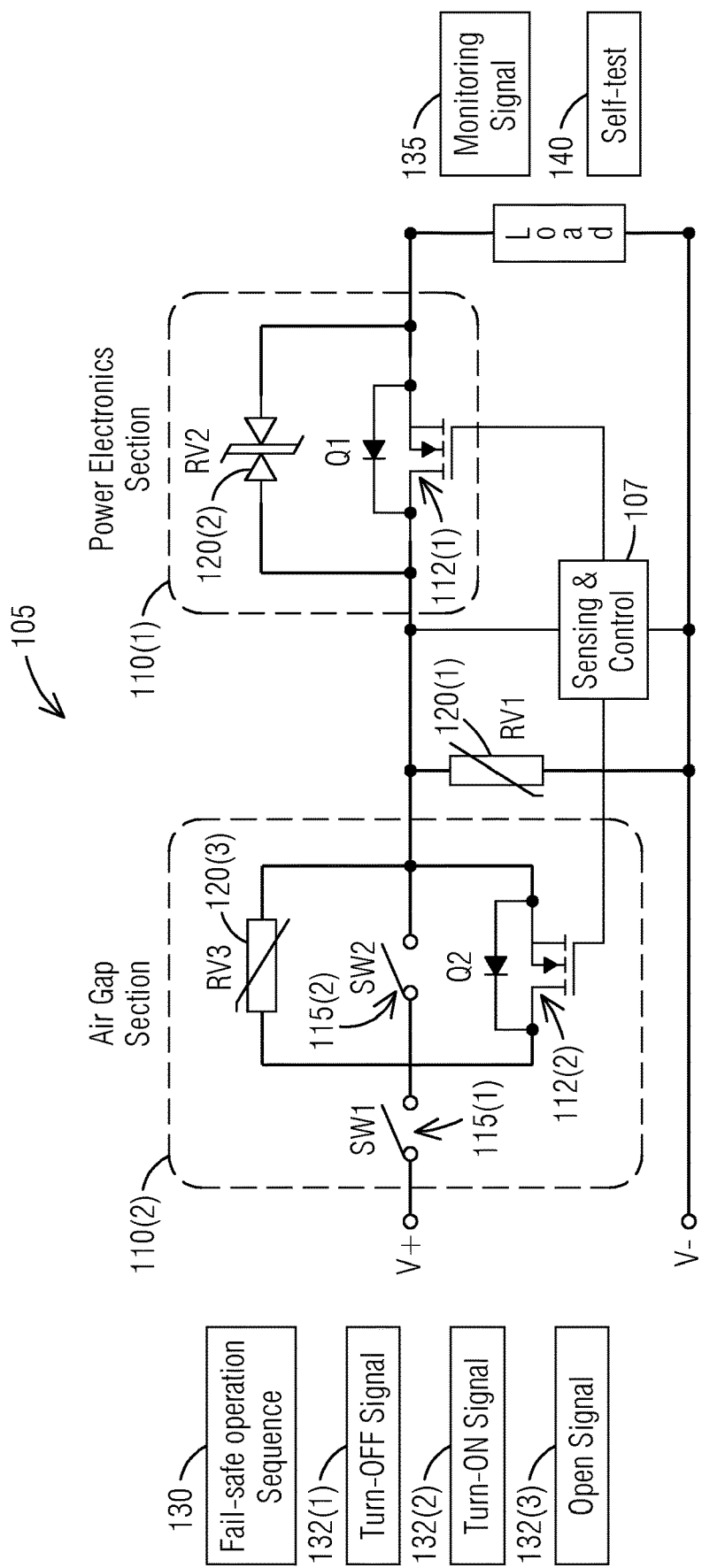
FIG. 1 illustrates a DC solid-state circuit breaker in accordance with an exemplary embodiment of the present invention.

Various technologies that pertain to systems and methods that facilitate a DC solid-state circuit breaker that can provide a fail-safe mechanism will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of a DC solid-state circuit breaker that includes a solid-state aided airgap. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the DC solid-state circuit breaker according to the present disclosure are described below with reference to FIGS. 1-6 herein. Like reference numerals used in the drawings identify similar or identical elements throughout the several views. The drawings are not necessarily drawn to scale.

Consistent with one embodiment of the present invention, FIG. 1 represents a DC solid-state circuit breaker 105 in accordance with an exemplary embodiment of the present invention. The DC solid-state circuit breaker 105 comprises a sensing and control circuit 107 configured to realize designed functions. The DC solid-state circuit breaker 105 further comprises a power electronics section 110(1) that includes a first solid-state switching component Q1 112(1) for normal operations. The DC solid-state circuit breaker 105 further comprises an air gap section 110(2) disposed in series with the power electronics section 110(1), and is configured to perform fail-safe interruption and to provide isolation. The air gap section 110(2) includes an isolation switch SW1 115(1) which is connected in series to a fail-safe interruption combination of a current commutation switch SW2 115(2) and a second solid-state switching component Q2 112(2), which are connected in parallel.

The DC solid-state circuit breaker 105 further comprises a first overvoltage protection device RV1 120(1) and a second overvoltage protection device RV2 120(2) which is provided to protect the first solid-state switching component Q1 112(1) during an overvoltage after interruptions. The first solid-state switching component Q1 112(1) is semiconductor based, such as metal-oxide-semiconductor field-effect transistors (MOSFETs) and Thyristors.

The DC solid-state circuit breaker 105 further comprises a third overvoltage protection device RV3 120(3). Both the isolation switch SW1 115(1) and the current commutation switch SW2 115(2) need to open for a successful fail-safe interruption. The first solid-state switching component Q1 112(1) may be a single component or multiple components connected in parallel and the second overvoltage protection device RV2 120(2) may be connected in parallel to the first solid-state switching component Q1 112(1) or may be connected between a system voltage after the first solid-state switching component Q1 112(1).

In the DC solid-state circuit breaker 105, the second solid-state switching component Q2 112(2) may be a single component or multiple components connected in parallel and both the isolation switch SW1 115(1) and the current commutation switch SW2 115(2) may be triggered to turn OFF by the sensing and control circuit 107 through actuators, such as solenoids and electromagnets.

In the DC solid-state circuit breaker 105, the first overvoltage protection device RV1 120(1), the second overvoltage protection device RV2 120(2), the third overvoltage protection device RV3 120(3) may be a Metal Oxide Varistor (MOV), a transient-voltage-suppression (TVS) diode, and a snubber circuit etc.

In the DC solid-state circuit breaker 105, a fail-safe operation sequence 130 of a fail-safe mechanism is as following: under conditions with component failures, where the first solid-state switching component Q1 112(1) is not able to interrupt, the current commutation switch SW2 115(2) opens to allow current to pass through the second solid-state switching component Q2 112(2), which then can be switched OFF for interruption such that the isolation switch SW1 115(1) also opens to provide a galvanic isolation.

Two different methods can be used to sequence operations between components during interruption: for a first method, after a time delay of sending a turn-OFF signal 132(1) to the first solid-state switching component Q1 112(1), the sensing and control circuit 107 sends an open signal 132(3) to the current commutation switch SW2 115(2) and sends a turn-ON signal 132(2) to the second solid-state switching component Q2 112(2) with or without a time delay such that the second solid-state switching component Q2 112(2) is then turned ON to carry the load current, and the current commutation switch SW2 115(2) is opened by its actuator. The second solid-state switching component Q2 112(2) is then turned OFF after a time delay, which allows the current commutation switch SW2 115(2) to physically open enough to withstand an overvoltage without breaking down. However, if the overvoltage is higher than a threshold of the third overvoltage protection device RV3 120(3), then the third overvoltage protection device RV3 120(3) turns ON automatically to absorb energy.

For a second method, a monitoring signal 135, such as voltage or position across the current commutation switch SW2 115(2) is used to determine if the second solid-state switching component Q2 112(2) is turned ON, and remaining sequence follows from above the first method.

When the DC solid-state circuit breaker 105 is in a normal condition, an operating sequence can still be implemented but the difference is that the first solid-state switching component Q1 112(1) interrupts a current at the beginning of the operating sequence and the air gap section 110(2) opens without a load current.

To reclose a circuit the isolation switch SW1 115(1) and the current commutation switch SW2 115(2) are closed first then the sensing and control circuit 107 is configured to perform a self-test 140 and turn ON the first solid-state switching component Q1 112(1) if the self-test 140 is successful. In case of a failure such as the shorted first solid-state switching component Q1 112(1), the self-test 140 is unsuccessful, and the operating sequence for the air gap section 110(2) happens to interrupt the current again while in case of other failure like the shorted second solid-state switching component Q2 112(2), the first solid-state switching component Q1 112(1) doesn't turn ON and no load current is available.

FIG. 1 shows the diagram of a solid-state circuit breaker for DC application. There are two sections connected in series in the main current path, the power electronics section 110(1) for normal use interruption, and the airgap section 110(2) for fail-safe interruption and isolation. The sensing and control circuit 107 is also provided to control the main current path. The sensing control circuit 107 can be powered by the system voltage or can be powered by other means. The sensing and control circuit 107 is also protected by a surge protection component such as the RV1 120(1).

The power electronics section 110(1) consists of main power electronics modules, such as MOSFETs or Thyristors, e.g., the Q1 112(1), and the second overvoltage protection device, RV2 120(2). The RV2 120(2) is to protect the main power electronics modules during the overvoltage after fast interruptions. The Q1 112(1) can be a single components or multiple components connected in parallel. The RV2 120(2) can be connected in parallel to the main power electronics modules or can be connected between the system voltage after the main power electronics.

The air gap section 110(2) is in series to the power electronics section 110(1) and is designed to perform fail-safe interruption and to provide isolation. The air gap section 110(2) consists of the isolation switch SW1 115(1), which is connected in series to a fail-safe interruption combination. The fail-safe interruption combination has the current commutation switch SW2 115(2), connected in parallel to the second solid-state switching component Q2 112(2), and the third overvoltage protection device RV3 120(3). The isolation switch SW1 115(1) and the current commutation switch SW2 115(2) are configured in such a way that the current commutation switch SW2 115(2) always open before the isolation switch SW1 115(1).

Figure 2:
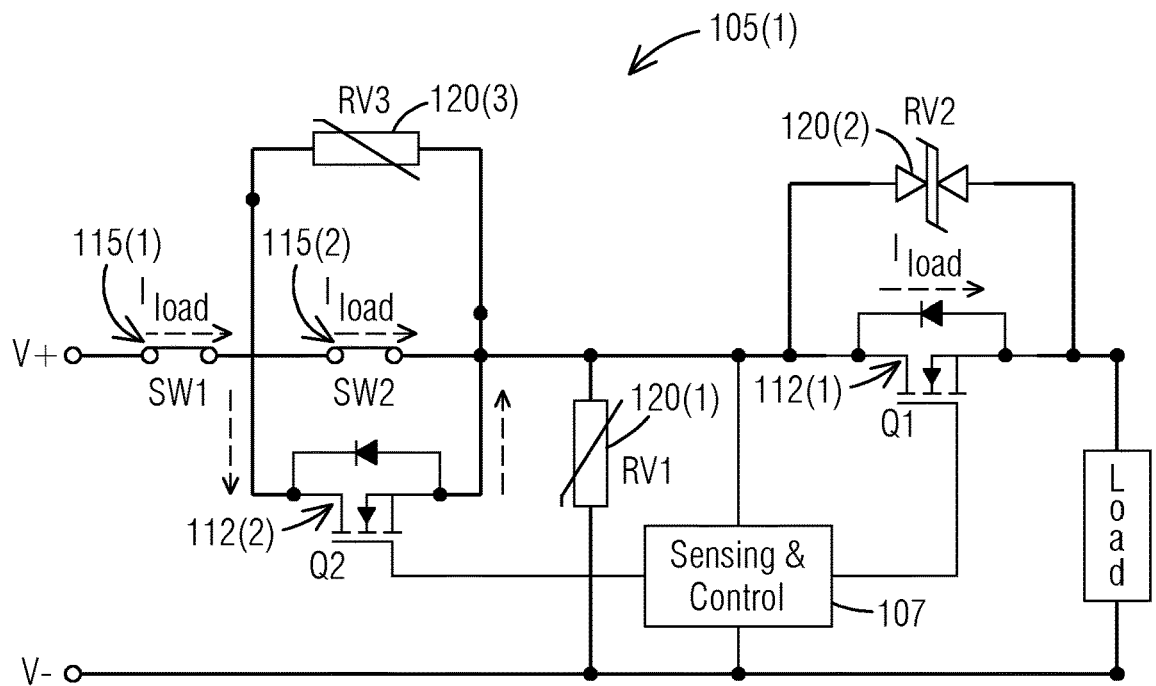
FIG. 2 illustrates a main current path of a DC solid-state circuit breaker in that if a Q1 fails being shorted, a current continues to flow as shown regardless of a turn-OFF signal to the Q1 in accordance with an exemplary embodiment of the present invention.

Referring to FIG. 2, it illustrates a main current path of a DC solid-state circuit breaker 105(1) in that if the Q1 112(1) fails being shorted, a current continues to flow as shown regardless of a turn-OFF signal to the Q1 112(1) in accordance with an exemplary embodiment of the present invention. A fail-safe operation sequence is as following. Under conditions with component failures, such as the Q1 112(1) is shorted, the sensing and control circuit 107 detects a fault condition or receive turn-OFF signals and sends a turn-OFF signal to the Q1 112(1). However, the Q1 112(1) is not able to interrupt, and a load current is still present, as shown in FIG. 2.

Figure 3:
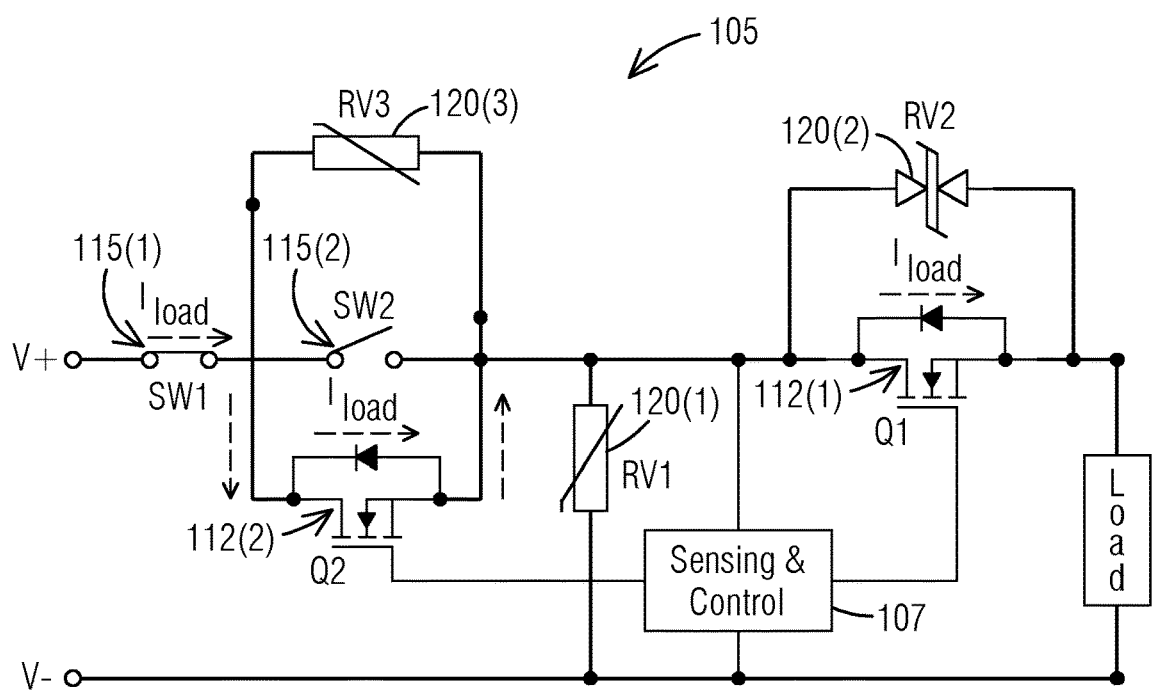
FIG. 3 illustrates a first sequencing method for the SW2, the Q2 and the RV3 in accordance with an exemplary embodiment of the present invention.

Turning now to FIG. 3, it illustrates a first sequencing method for the current commutation switch SW2 115(2), the second solid-state switching component Q2 112(2) and the third overvoltage protection device RV3 120(3) in accordance with an exemplary embodiment of the present invention. As stated before, mechanical switches, such as the isolation switch SW1 115(1) and the current commutation switch SW2 115(2), have challenges of interrupting the currents on their own, especially when the system voltage is high. Therefore, the combination of the current commutation switch SW2 115(2), the second solid-state switching component Q2 112(2) and the third overvoltage protection device RV3 120(3) is used to ensure successful interruption. In this case the second solid-state switching component Q2 112(2) becomes the main interruption component and is not affected by the lack of zero crossing. Two different methods can be used to sequence the operations between the components. For the first method, after a time delay, the sensing and control circuit 107 sends an open signal to the current commutation switch SW2 115(2) and sends a turn-ON signal to the second solid-state switching component Q2 112(2) with or without a time delay. The second solid-state switching component Q2 112(2) is then turned ON to carry the load current, and the current commutation switch SW2 115(2) is opened by its actuator. The second solid-state switching component Q2 112(2) is then turned OFF after a time delay, which allows the current commutation switch SW2 115(2) to physically open enough to withstand the overvoltage without breaking down, as shown in FIG. 3.

Figure 4:
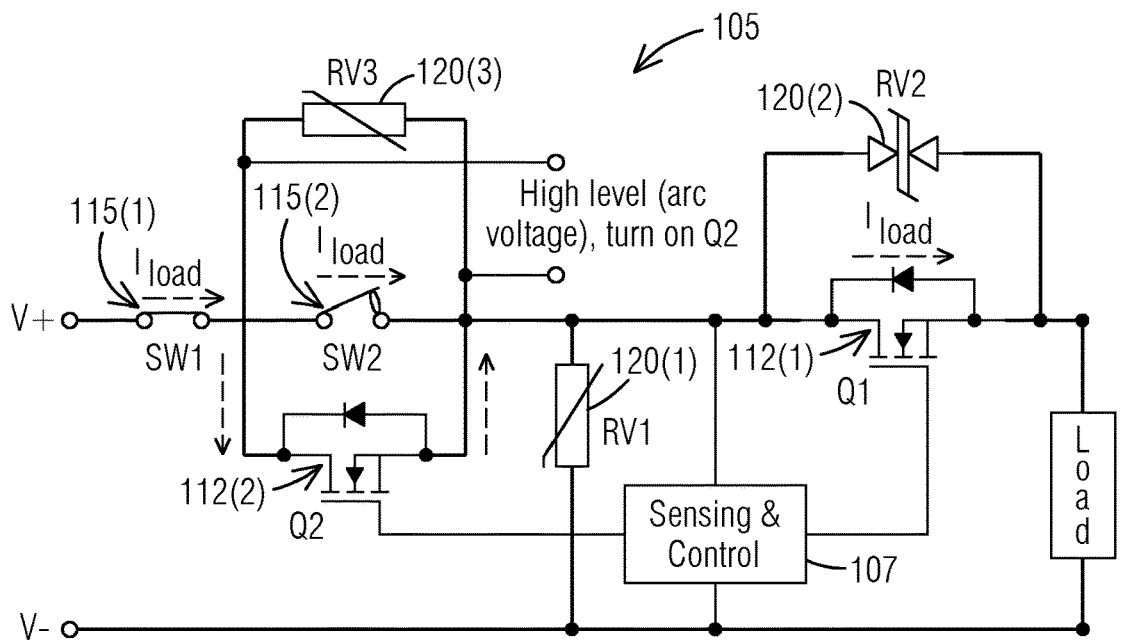
FIG. 4 illustrates a second sequencing method for the SW2, the Q2 and the RV3 in that the arcs between the SW2 contacts triggers a high voltage and turns on the Q2 in accordance with an exemplary embodiment of the present invention.

FIG. 4 illustrates a second sequencing method for the current commutation switch SW2 115(2), the second solid-state switching component Q2 112(2) and the third overvoltage protection device RV3 120(3) in that the arcs between the current commutation switch SW2 115(2) contacts triggers a high voltage and turns ON the second solid-state switching component Q2 112(2) in accordance with an exemplary embodiment of the present invention. If the overvoltage is higher than the threshold of the third overvoltage protection device RV3 120(3), the third overvoltage protection device RV3 120(3) turns ON automatically to absorb the energy. For this first method, the advantage is that the current commutation switch SW2 115(2) doesn't need to open under current, so arcing is eliminated or minimized. The drawback is that the second solid-state switching component Q2 112(2) needs to stay ON with a load current for relatively long period, since it needs to stay ON before the current commutation switch SW2 115(2) opens and to stay ON after the current commutation switch SW2 115(2) opens wide enough to withstand overvoltage. With a large load current, the long ON-time of the second solid-state switching component Q2 112(2) means more expensive and sophisticated components. Therefore, this method is better suited for a smaller load current. For the second method, a voltage monitoring is added across the current commutation switch SW2 115(2), and the voltage across the current commutation switch SW2 115(2) is used to determine if the second solid-state switching component Q2 112(2) is turned ON. When the current commutation switch SW2 115(2) is opened by an actuator, an arc is drawn, and a voltage jump in the order of 10-20V is seen across the current commutation switch SW2 115(2). The higher voltage level can be used as the trigger to turn ON the second solid-state switching component Q2 112(2), and hence commute the current from the current commutation switch SW2 115(2) to the second solid-state switching component Q2 112(2), as shown in FIG. 4.

Figure 5:
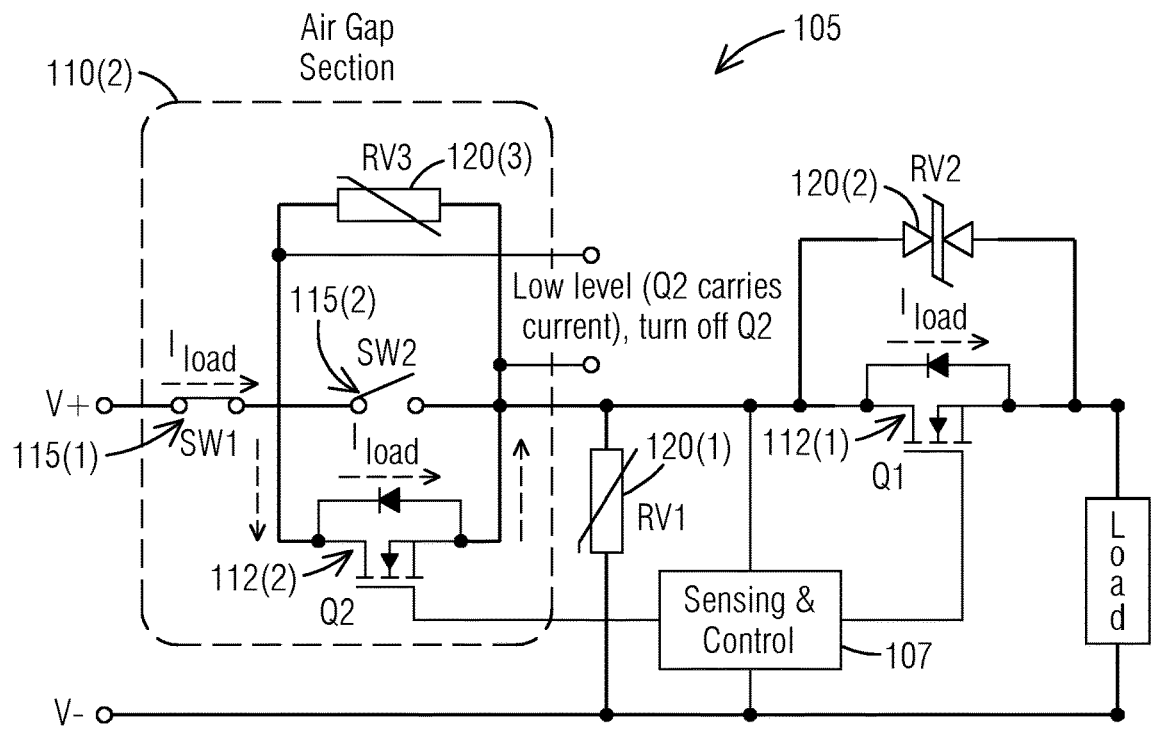
FIG. 5 illustrates a second sequencing method for the SW2, the Q2 and the RV3 in that a current is transferred from the SW2 to the Q2 after the Q2 is turned ON and a low voltage is observed, and it turns OFF the Q2 in accordance with an exemplary embodiment of the present invention.

As seen in FIG. 5, it illustrates a second sequencing method for the current commutation switch SW2 115(2), the second solid-state switching component Q2 112(2) and the third overvoltage protection device RV3 120(3) in that a current is transferred from the current commutation switch SW2 115(2) to the second solid-state switching component Q2 112(2) after the second solid-state switching component Q2 112(2) is turned ON and a low voltage is observed, and it turns OFF the second solid-state switching component Q2 112(2) in accordance with an exemplary embodiment of the present invention.

After current is transferred to the second solid-state switching component Q2 112(2), the on-state voltage drop of the second solid-state switching component Q2 112(2) is normally much smaller, in the order of 3-4V. This lower voltage level can be used as the trigger to turn OFF the second solid-state switching component Q2 112(2), and the current is interrupted, as shown in FIG. 5. The advantage of this second method is that the second solid-state switching component Q2 112(2) is only turned ON when necessary, therefore doesn't require expensive components. The drawbacks are arcs between the current commutation switch SW2 115(2) contacts, and the second solid-state switching component Q2 112(2) may have to be turned ON and OFF more than once until the current commutation switch SW2 115(2) is opened wide enough to withstand overvoltage. After the load current is interrupted by the combination of the current commutation switch SW2 115(2), the second solid-state switching component Q2 112(2) and the third overvoltage protection device RV3 120(3), the isolation switch SW1 115(1) is then opened for isolation, as shown in FIG. 1.

When the DC solid-state circuit breaker 105 is in a normal condition, the operating sequence above can still be implemented. The difference is that the first solid-state switching component Q1 112(1) interrupts the current at the beginning of the operating sequence, and the air gap section 110(2) opens without a load current.

To reclose the circuit, the isolation switch SW1 115(1) and the current commutation switch SW2 115(2) are closed first, no particular order needed. Then, the sensing and control circuit 107 performs a self-test and turns ON the first solid-state switching component Q1 112(1) if the self-test is successful. In case of failure like the shorted first solid-state switching component Q1 112(1), the self-test is unsuccessful, and the operation sequence for the air gap section 110(2) as described above happens to interrupt the current again. In case of other failure like the shorted second solid-state switching component Q2 112(2), the first solid-state switching component Q1 112(1) doesn't turn ON and no load current is available.

Figure 6:
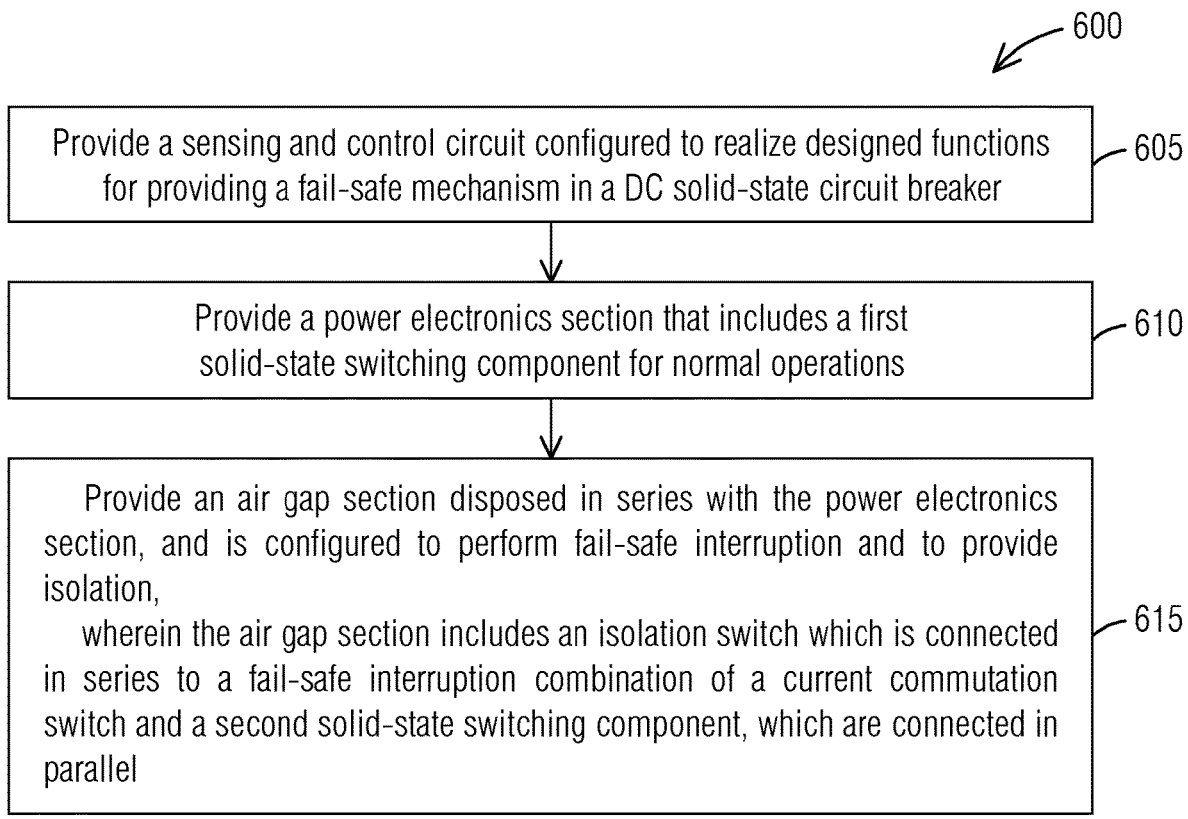
FIG. 6 illustrates a method for providing a fail-safe mechanism in a DC solid-state circuit breaker in accordance with an exemplary embodiment of the present invention.

As shown in FIG. 6, it illustrates a method 600 for providing a fail-safe mechanism in the DC solid-state circuit breaker 105 in accordance with an exemplary embodiment of the present invention. Reference is made to the elements and features described in FIGS. 1-5. It should be appreciated that some steps are not required to be performed in any particular order, and that some steps are optional.

The method 600 comprises a step 605 of providing the sensing and control circuit 107 configured to realize designed functions. The method 600 further comprises a step 610 of providing the power electronics section 110(1) that includes a first solid-state switching component Q1 for normal operations. The method 600 further comprises a step 615 of providing the air gap section 110(2) disposed in series with the power electronics section 110(1) and is configured to perform fail-safe interruption and to provide isolation. The air gap section 110(2) includes the isolation switch SW1 which is connected in series to a fail-safe interruption combination of the current commutation switch SW2 and the second solid-state switching component Q2, which are connected in parallel.

While a semiconductor material-based design of the first solid-state switching component such as metal-oxide-semiconductor field-effect transistors (MOSFETs) and Thyristors is described here a range of one or more other materials are also contemplated by the present invention. For example, other materials may be implemented based on one or more features presented above without deviating from the spirit of the present invention.

The techniques described herein can be particularly useful for a smaller, more cost effective, and more reliable DC circuit breaker design that uses a solid-state aided airgap to ensure successful interruption of current at DC conditions. While particular embodiments are described in terms of this arrangement, the techniques described herein are not limited to such an arrangement but can also be used with other arrangements.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A DC solid-state circuit breaker comprising:
   a sensing and control circuit configured to realize designed functions,
   a power electronics section that includes a first solid-state switching component for normal operations, and
   an air gap section disposed in series with the power electronics section, and is configured to perform fail-safe interruption and to provide isolation,
   wherein the air gap section includes an isolation switch which is connected in series to a fail-safe interruption combination of a current commutation switch and a second solid-state switching component, the current commutation switch and the second solid-state switching component being connected in parallel,
   a first overvoltage protection device,
   a second overvoltage protection device which is provided to protect the first solid-state switching component during an overvoltage after interruptions,
   wherein the first solid-state switching component is semiconductor based and is selected from metal-oxide-semiconductor field-effect transistors (MOSFETs) and Thyristors,
   a third overvoltage protection device, wherein both the isolation switch and the current commutation switch need to open for a successful fail-safe interruption, and
   wherein the first solid-state switching component is a single component or multiple components connected in parallel, and the second overvoltage protection device is connected in parallel to the first solid-state switching component or is connected between a system voltage after the first solid-state switching component.

2. The DC solid-state circuit breaker of claim 1,
   wherein the second solid-state switching component is a single component or multiple components connected in parallel and both the isolation switch and the current commutation switch are triggered to turn OFF by the sensing and control circuit through actuators, such as solenoids and electromagnets.

3. The DC solid-state circuit breaker of claim 1,
   wherein the first overvoltage protection device, the second overvoltage protection device, the third overvoltage protection device are selected from a Metal Oxide Varistor (MOV), a transient-voltage-suppression (TVS) diode, and a snubber circuit.

4. The DC solid-state circuit breaker of claim 1,
   wherein a fail-safe operation sequence of a fail-safe mechanism is as following: under conditions with component failures, where the first solid-state switching component is unable to interrupt, the current commutation switch opens to allow current to pass through the second solid-state switching component, which is then switched OFF for interruption, wherein the isolation switch also opens to provide a galvanic isolation.

5. The DC solid-state circuit breaker of claim 4,
   wherein two different methods are used to sequence operations between components during interruption:
   for a first method, after a time delay of sending a turn-OFF signal to the first solid-state switching component, the sensing and control circuit sends an open signal to the current commutation switch and sends a turn-ON signal to the second solid-state switching component with or without a time delay such that the second solid-state switching component is then turned ON to carry the load current, and the current commutation switch is opened by its actuator,
   wherein the second solid-state switching component is then turned OFF after a time delay, which allows the current commutation switch to physically open to withstand an overvoltage without breaking down,
wherein if the overvoltage is higher than a threshold of the third overvoltage protection device, then the third overvoltage protection device turns ON automatically to absorb energy.

6. The DC solid-state circuit breaker of claim 5,
wherein for a second method, a monitoring signal, either a voltage or position signal across the current commutation switch, is used to determine if the second solid-state switching component is turned ON.

7. The DC solid-state circuit breaker of claim 6,
wherein when the DC solid-state circuit breaker is in a normal condition, an operating sequence is implemented, wherein the first solid-state switching component interrupts a current at a beginning of the operating sequence and the air gap section opens without a load current.

8. The DC solid-state circuit breaker of claim 7,
wherein to reclose a circuit the isolation switch and the current commutation switch are closed first then the sensing and control circuit is configured to perform a self-test and turn ON the first solid-state switching component if the self-test is successful.

9. A method for providing a fail-safe mechanism in a DC solid-state circuit breaker, the method comprising:
providing a sensing and control circuit configured to realize designed functions,
providing a power electronics section that includes a first solid-state switching component for normal operations,
providing an air gap section disposed in series with the power electronics section, and is configured to perform fail-safe interruption and to provide isolation,
wherein the air gap section includes an isolation switch which is connected in series to a fail-safe interruption combination of a current commutation switch and a second solid-state switching component, the current commutation switch and the second solid-state switching component being connected in parallel,
providing a first overvoltage protection device;
providing a second overvoltage protection device to protect the first solid-state switching component during an overvoltage after interruptions,
wherein the first solid-state switching component is semiconductor based and selected from metal-oxide-semiconductor field-effect transistors (MOSFETs) and Thyristors; and
providing a third overvoltage protection device, wherein both the isolation switch and the current commutation switch need to open for a successful fail-safe interruption, and
wherein the first solid-state switching component is a single component or multiple components connected in parallel and the second overvoltage protection device is connected in parallel to the first solid-state switching component or is connected between a system voltage after the first solid-state switching component.

10. The method of claim 9,
wherein the second solid-state switching component is a single component or multiple components connected in parallel and both the isolation switch and the current commutation switch are triggered to turn OFF by the sensing and control circuit through actuators, selected from solenoids and electromagnets.

11. The method of claim 9,
wherein the first overvoltage protection device, the second overvoltage protection device, the third overvoltage protection device are selected from a Metal Oxide Varistor (MOV), a transient-voltage-suppression (TVS) diode, and a snubber circuit.

12. The method of claim 9,
wherein a fail-safe operation sequence of a fail-safe mechanism is as following: under conditions with component failures, where the first solid-state switching component is unable to interrupt, the current commutation switch opens to allow current to pass through the second solid-state switching component, which is then switched OFF for interruption, wherein the isolation switch also opens to provide a galvanic isolation.

13. The method of claim 12,
wherein two different methods are used to sequence operations between components during interruption:
for a first method, after a time delay of sending a turn-OFF signal to the first solid-state switching component, the sensing and control circuit sends an open signal to the current commutation switch and sends a turn-ON signal to the second solid-state switching component with or without a time delay such that the second solid-state switching component is then turned ON to carry the load current, and the current commutation switch is opened by its actuator,
wherein the second solid-state switching component is then turned OFF after a time delay, which allows the current commutation switch to physically open to withstand an overvoltage without breaking down,
wherein if the overvoltage is higher than a threshold of the third overvoltage protection device, then the third overvoltage protection device turns ON automatically to absorb energy.

14. The method of claim 13,
wherein for a second method, a monitoring signal, either a voltage or position signal across the current commutation switch, is used to determine if the second solid-state switching component is turned ON.

15. The method of claim 14,
wherein when the DC solid-state circuit breaker is in a normal condition, an operating sequence is implemented, wherein the first solid-state switching component interrupts a current at a beginning of the operating sequence and the air gap section opens without a load current.

16. The method of claim 15,
wherein to reclose a circuit the isolation switch and the current commutation switch are closed first then the sensing and control circuit is configured to perform a self-test and turn ON the first solid-state switching component if the self-test is successful.

* * * * *